US008965343B1

(12) United States Patent
Paczkowski et al.

(10) Patent No.: US 8,965,343 B1
(45) Date of Patent: Feb. 24, 2015

(54) SECURITY KEY BASED AUTHORIZATION OF TRANSCEIVERS IN WIRELESS COMMUNICATION DEVICES (71) Applicant: Sprint Communications Company L.P., Overland Park, KS (US)

(72) Inventors: Lyle Walter Paczkowski, Mission Hills, KS (US); Matthew C. Schlesener, Shawnee, KS (US); William M. Parsel, Overland Park, KS (US); Carl Joseph Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/018,857

(22) Filed: Sep. 5, 2013

(51) Int. Cl.
*H04M 11/00* (2006.01)
*H04W 12/04* (2009.01)

(52) U.S. Cl.
CPC ..................................... *H04W 12/04* (2013.01)
USPC ........ 455/411; 455/426.1; 370/331; 370/332; 370/333; 370/334

(58) Field of Classification Search
CPC .......... H04W 36/003; H04W 36/0025; H04W 36/0016; H04W 4/003; H04L 2212/0025; H04L 92/00–92/24
USPC .......................... 455/411, 426.1; 370/331–334
See application file for complete search history.

(56) References Cited

U.S. PATENT DOCUMENTS

| 5,907,804 | A  | * | 5/1999 | Schroderus et al. | .......... | 455/411 |
| 8,082,005 | B1 | * | 12/2011 | Craven | .......................... | 455/558 |
| 8,275,415 | B2 | * | 9/2012 | Huslak | .......................... | 455/558 |
| 8,787,966 | B2 | * | 7/2014 | Altman | ....................... | 455/552.1 |
| 2004/0180657 | A1 | * | 9/2004 | Yaqub et al. | ............... | 455/435.1 |
| 2009/0016300 | A1 |  | 1/2009 | Ahmavaara et al. |  |  |
| 2009/0029736 | A1 | * | 1/2009 | Kim et al. | ...................... | 455/558 |
| 2009/0045983 | A1 | * | 2/2009 | Miller | ........................... | 340/984 |
| 2009/0303966 | A1 |  | 12/2009 | Cherian et al. |  |  |
| 2010/0304782 | A1 | * | 12/2010 | Chang et al. | ................ | 455/552.1 |
| 2011/0077003 | A1 | * | 3/2011 | Shin | .............................. | 455/434 |
| 2011/0077031 | A1 | * | 3/2011 | Kim et al. | ...................... | 455/458 |
| 2011/0117909 | A1 | * | 5/2011 | Cao et al. | ....................... | 455/423 |
| 2012/0058748 | A1 | * | 3/2012 | Jeung et al. | ................. | 455/414.1 |
| 2012/0129498 | A1 | * | 5/2012 | Morikuni et al. | ............. | 455/411 |
| 2012/0149330 | A1 | * | 6/2012 | Watson et al. | ................ | 455/411 |
| 2014/0146732 | A1 | * | 5/2014 | Olufunmilola et al. | ....... | 370/311 |
| 2014/0274006 | A1 | * | 9/2014 | Mutya et al. | .................. | 455/416 |

\* cited by examiner

*Primary Examiner* — Charles Shedrick (57) ABSTRACT

Systems, methods, and software for operating communication systems and wireless communication devices are provided herein. In one example, a method of operating a wireless communication is provided. In security circuitry of the wireless communication device, the method includes receiving a request from processing circuitry for an application to access a first communication network with a first communication transceiver, and processing the request and a security key to authorize the application to use the first communication transceiver to access the first communication network. In the first communication transceiver, the method includes exchanging communications over the first communication network for the application responsive to the authorization. In the security circuitry, the method also includes identifying that the application is using a second unauthorized communication transceiver, and in response, terminating the authorization for the application to use the first communication transceiver to access the first communication network.

20 Claims, 5 Drawing Sheets

SECURITY KEY BASED AUTHORIZATION OF TRANSCEIVERS IN WIRELESS COMMUNICATION DEVICES

TECHNICAL FIELD

Aspects of the disclosure are related to the field of communication systems, and in particular, authorization of communication transceivers in wireless communication devices based on security keys.

TECHNICAL BACKGROUND

Wireless communication systems typically include wireless access systems with equipment such as wireless access nodes along with various control and routing nodes which provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchange, web pages, streaming media, or text messages, among other communication services.

In some wireless communication systems, more than one wireless communication network can be employed across a similar geographic region, with each wireless communication network including one or more sectors of wireless coverage. For example, a first wireless network employing a first wireless communication protocol can be deployed along with a second wireless network employing a second wireless communication protocol. Separate wireless access equipment can be deployed for each wireless network, such as when a fourth generation (4G) Long Term Evolution (LTE) wireless network is deployed over a similar geographic area as a third generation (3G) wireless network or other wireless networks.

Wireless communication devices can be configured to support multiple wireless access modes, such as communicating with one or more wireless networks using one or more communication transceivers and associated equipment. However, selecting and authorizing which wireless access mode, protocol, or transceiver to use for any given communication session can be complicated due to loading conditions, network preferences, RF conditions, or security concerns.

In addition to multiple transceivers, some wireless communication devices include partitioned security 'zones' in their associated processing systems. For example, a first zone can be employed to execute open or untrusted applications and obtain untrusted or unauthenticated data, and a second zone can be employed to execute trusted applications or obtain authenticated data. These security zones can be implemented on separate microprocessors, in separate cores of a multi-core microprocessor, or otherwise allocated over different processing portions of a wireless communication device. However, when multiple transceivers are employed on a wireless communication device, authorization for each transceiver can be difficult due to the various security zone measures as well as due to applications that might attempt to use unauthorized transceivers.

OVERVIEW

Systems, methods, and software for operating communication systems and wireless communication devices are provided herein. In one example, a method of operating a wireless communication is provided. In security circuitry of the wireless communication device, the method includes receiving a request from processing circuitry for an application to access a first communication network with a first communication transceiver, and processing the request and a security key to authorize the application to use the first communication transceiver to access the first communication network. In the first communication transceiver, the method includes exchanging communications over the first communication network for the application responsive to the authorization. In the security circuitry, the method also includes identifying that the application is using a second unauthorized communication transceiver, and in response, terminating the authorization for the application to use the first communication transceiver to access the first communication network.

In another example, a wireless communication device is provided. The wireless communication device includes security circuitry that stores one or more security keys, processing circuitry that executes applications, and a plurality of communication transceivers to communicate over a plurality of communication networks. The security circuitry is configured to receive a request from the processing circuitry for an application to access a first communication network with a first communication transceiver, and process the request and a security key to authorize the application to use the first communication transceiver to access the first communication network. The first communication transceiver is configured to exchange communications over the first communication network for the application responsive to the authorization. The security circuitry is configured to identify that the application is using a second unauthorized communication transceiver, and in response, terminate the authorization for the application to use the first communication transceiver to access the first communication network.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
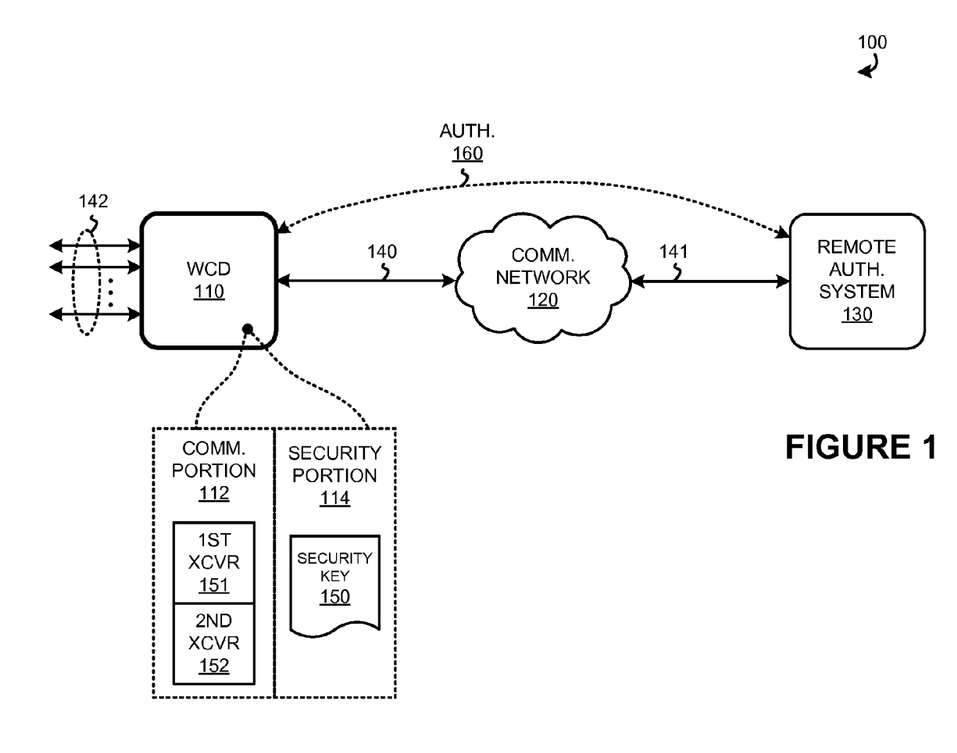
FIG. 1 is a system diagram illustrating a communication system.

FIG. 1 is a system diagram illustrating communication system 100. Communication system 100 includes wireless communication device (WCD) 110, communication network 120, and remote authorization system 130. WCD 110 and communication network 120 communicate over communication link 140. Communication network 120 and remote authorization system 130 communicate over communication link 141. WCD 110 includes communication portion 112 communicatively coupled to security portion 114. Communication portion 112 comprises one or more communication transceivers, namely first transceiver 151 and second transceiver 152, although further communication transceivers can be included. Each communication transceiver of WCD 110 can communicate over ones of communication links 142. Security portion 114 includes security circuitry that stores one or more security keys.

In operation, WCD 110 includes one or more communication transceivers which can communicate over one or more wireless or wired communication networks, such as over ones of communication links 140 or 142. However, in some examples, before certain communications can be exchanged, a communication transceiver of WCD 110 must be authorized for those communications. WCD 110 authorizes a particular communication transceiver with remote authorization system 130 before communications through that transceiver can be trusted. WCD 110 includes one or more security keys, and stores these security keys in storage media associated with security circuitry of security portion 114. These security keys can be employed in authorizing the various communication transceivers of WCD 110.

As shown in FIG. 1, when a particular communication transceiver is requested for communications, such as by an application executed on WCD 110, then that particular communication transceiver is first authorized. In some examples, authorization process 160 occurs between WCD 110 and remote authorization system 130. Once a particular communication transceiver is authorized, then communications can be exchanged over the particular communication network associated with the authorized communication transceiver.

Figure 2:
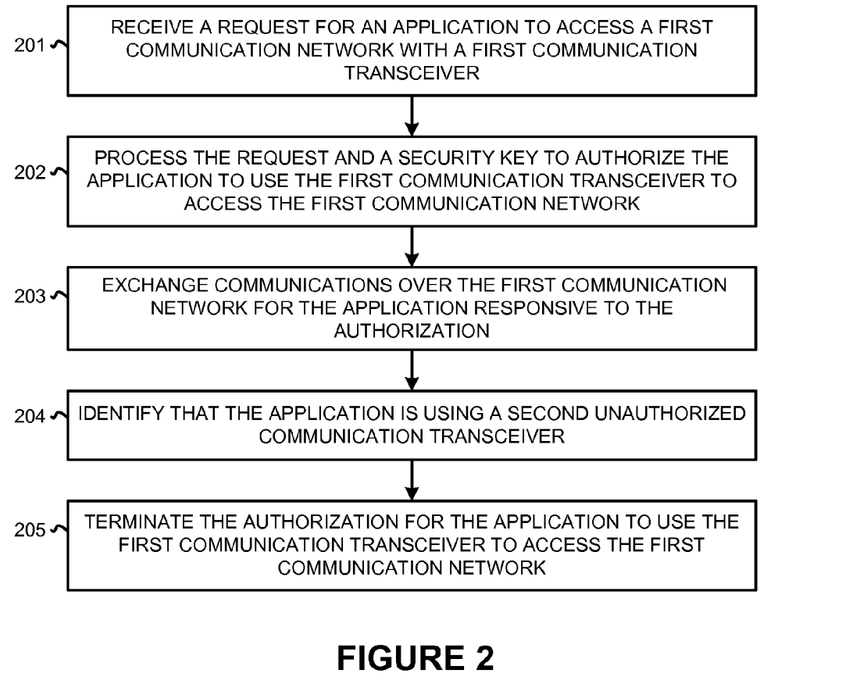
FIG. 2 is a flow diagram illustrating a method of operation of a wireless communication device.

FIG. 2 is presented to illustrate another example operation of the elements of FIG. 1. FIG. 2 is a flow diagram illustrating a method of operation of WCD 110. The operations of FIG. 2 are referenced below parenthetically. As discussed above, WCD 110 includes communication portion 112 which comprises one or more transceivers, and security portion 114 which stores one or more security keys.

In FIG. 2, security portion 114 of WCD 110 receives (201) a request for an application to access a first communication network with a first communication transceiver. In this example, the first communication network can be a communication network accessible over an associated one of links 140 and 142, and the first communication transceiver is transceiver 151. The request can be in response to a user of WCD 110 initiating a voice communication or data communication, such as voice calls, text messaging, data transfer, web browsing, email, or other activities of an application executed on WCD 110. The application can include an application which requests secure or trusted communications through a particular communication transceiver. The application can be executed by a portion of WCD 110 other than security portion 114, such as an open or unsecure processing portion of WCD 110. A request to security portion 114 to authorize the first communication network with the first communication transceiver can be issued by the application through various operating system calls to initiate a communication session.

Security portion 114 of WCD 110 processes (202) the request and a security key to authorize the application to use first communication transceiver 151 to access the first communication network. In this example, security portion 114 includes at least one security key 150. Security key 150 can be stored in a non-transitory computer readable medium of security portion 114. To authorize the application to use first communication transceiver 151, security portion can process security key 150 to determine a hash result and transfer the hash result for delivery to remote authorization system 130 over link 140. Remote authorization system 130 can receive the hash result and responsively authorize the hash result.

Security key 150 can be an encryption key, pseudorandom key, private key, or other security key. In some examples, more than one security key can be stored in security portion 114 of WCD 110, and each security key can be associated with a different communication transceiver of communication portion 112 of WCD 110. Each security key stored in WCD 110 can be processed to determine a hash result or other encryption result, possibly using seed data. This hash result for one or more of the security keys can be transferred in authorization process 160 to authorize a particular communication transceiver of WCD 110.

Authorization process 160 can include a security challenge issued by remote authorization system 130 and a security response issued by security portion 114 of WCD 110. If successful, then remote authorization system 130 can issue a security grant for security portion 114 to authorize first communication transceiver 151. The security challenge can include a request for one or more hash results, security keys, passwords, usernames, or device identifiers, among other security and identification information. In some examples, the security challenge includes data or information which is to be processed using a security key or security keys included in security portion 114 of WCD 110. For example, the security challenge can include seed data that is to be encoded or encrypted using the security keys stored in security portion 114 of WCD 110.

After first communication transceiver 151 is authorized, then first communication transceiver 151 exchanges (203) communications over the first communication network for the application responsive to the authorization. As discussed above, these communications can include voice communications, data communications, text messages, or other communications, including combinations thereof. The first communication network used for the communications in operation 203 can be any communication network accessible over an associated one of links 140 or 142. It should be understood that communication network 120 can be used for the communications in operation 203. In some examples, the communications are also encrypted or encoded using the security key used to generate the hash result indicated in authorization process 160. An alert or indicator can be transferred by WCD 110 to authorization system 130 or to a system with which WCD 110 is communicating using first communication transceiver 151 that indicates the authorization of first communication transceiver 151.

Security portion 114 identifies (204) that the application is using a second unauthorized communication transceiver, such as second communication transceiver 152. The application might attempt to use second communication transceiver inadvertently or intentionally, such as a malicious application attempting to use a transceiver that has not been authorized or authenticated. Security portion 114 detects the attempted use of second communication transceiver 152.

Responsive to identifying that the application is using the unauthorized communication transceiver, security portion 114 terminates (205) the authorization for the application to use first communication transceiver 151 to access the first communication network. In this example, the application is prevented from using an unauthorized second communication transceiver when only authorized for first communication transceiver 151. An alert or indicator can be transferred by WCD 110 to authorization system 130 or to a system with which WCD 110 is presently communicating that indicates the termination of the authorization of first communication transceiver 151.

Figure 3:
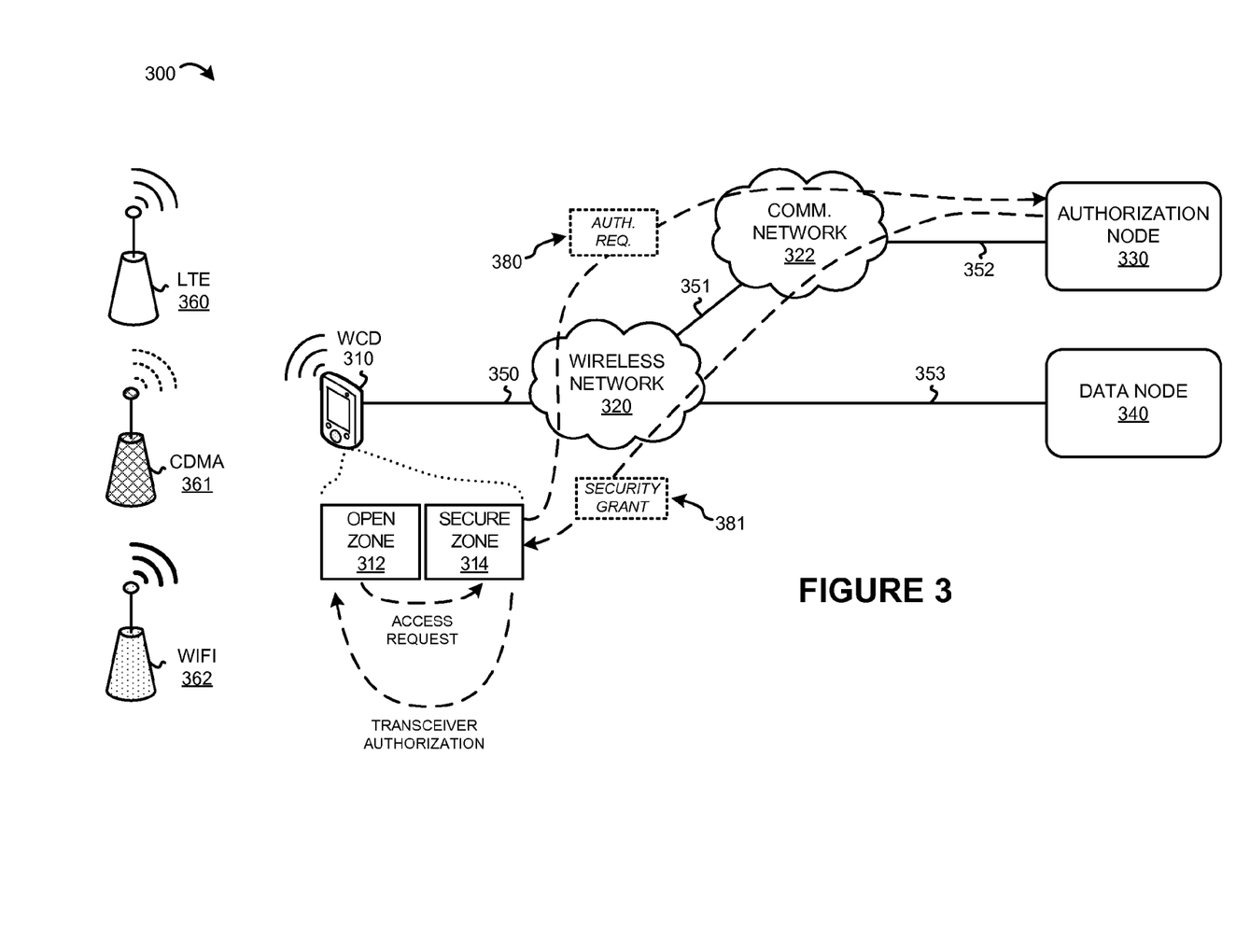
FIG. 3 is a system diagram illustrating a communication system.

As another example of a wireless communication device and associated communication and data nodes, FIG. 3 is presented. FIG. 3 is a system diagram illustrating communication system 300. Communication system 300 includes wireless communication device (WCD) 310, wireless network 320, communication network 322, authorization node 330, data node 340, and wireless access nodes 360-362. WCD 310 and wireless network 320 communicate over wireless link 350, which is a cellular voice and data link in this example. Wireless network 320 and communication network 322 communicate over link 351, which is an optical networking link in this example. Authorization node 330 and communication network 322 communicate over link 352, which is an Ethernet communication link in this example. Data node 340 and wireless network 320 communicate over link 353, which is an Internet protocol (IP) link in this example.

WCD 310 includes a plurality of transceiver portions, each transceiver portion associated with a different wireless communication protocol. In this example, at least three communication transceiver portions or transceiver types are included in WCD 310, and are omitted for clarity in FIG. 3. These at least three communication transceiver portions can include a Long Term Evolution (LTE) transceiver portion, a Code Division Multiple Access (CDMA) transceiver portion, and an IEEE 802.11 WiFi transceiver portion. It should be understood that any number and type of transceiver portion or transceiver type can be included in WCD 310, including wired, wireless, optical, and other transceiver types using any associated communication protocol, frequencies, RF spectrum, and the like.

WCD 310 also includes open zone 312 and secure zone 314. Each of these zones of WCD 310 can be implemented in a separate microprocessor, microprocessor core, system on a chip, virtual core, or other hardware or software partition that separates memory spaces, operating systems, drivers, and other operational hardware and software elements so as to provide a restricted level of access for applications and users to secure zone 314, and a non-restricted level of access for open zone 312. In some examples, open zone 312 comprises a standard core of a processor system, such as for operating an Android, Windows, iOS, or other user-accessible operating system. Likewise, secure zone 314 comprises in some examples, a secure core or "trust zone" core of a processor system which prevents access to the processing and memory elements of secure zone 314 unless authorized through a security exchange or security handshake with authorization node 330.

This partitioned configuration of secure zone 314 differs from user-level password protected access, in that any application that desires to execute on secure zone 314 must first be authorized by a security handshaking process with authorization node 330. Open zone 312 might run applications after a user merely "logs in" or passes a user-level security access, and the applications executed on open zone 312 are not authorized through a security handshaking process with authorization node 330. In some examples, such as found in FIG. 1, a communication portion (such as communication portion 112) is located in open zone 312, while a security portion (such as security portion 114) is located in secure zone 314. It should be understood that these partitions can be varied.

Communication networks 320 and 322 each comprise wired and wireless network equipment for routing communications between various endpoints and over various communication links. In this example, wireless network 320 comprises a cellular voice and data network comprising one or more wireless access nodes distributed over a geographic area, while communication network 322 comprises an IP network including one or more routing nodes. Communication networks 320 and 322 can include elements described for communication network 120 in FIG. 1.

Authorization node 330 and data node 340 can each include communication or network interfaces, as well as computer systems, microprocessors, circuitry, cloud-based systems, or some other processing devices or software systems, and can be distributed among multiple processing devices. Examples of authorization node 330 and data node 340 can also each include software such as an operating system, logs, databases, utilities, drivers, networking software, and other software stored on a computer-readable medium. Authorization node 330 and data node 340 can include elements described for remote authorization system 130 of FIG. 1. It should be noted that in some examples, data node 340 is included in authorization node 330.

Wireless access nodes 360-362 are each associated with a different wireless network that WCD 310 can communicate with over an associated wireless link. In FIG. 3, wireless access node 360 corresponds to a Long Term Evolution (LTE) cellular voice and data network, wireless access node 361 corresponds to a Code Division Multiple Access (CDMA) cellular voice and data network, and wireless access node 362 corresponds to an IEEE 802.11 WiFi access point, such as for a home or office data network. It should be understood that other data networks and access points can be employed, and that wireless network 320 can incorporate ones of wireless access nodes 360-362. Additionally, WCD 310 can include a Universal Serial Bus (USB) or other wired transceivers, such as Ethernet, which can communicate with other systems and networks which are not shown in FIG. 3 for clarity.

Figure 4:
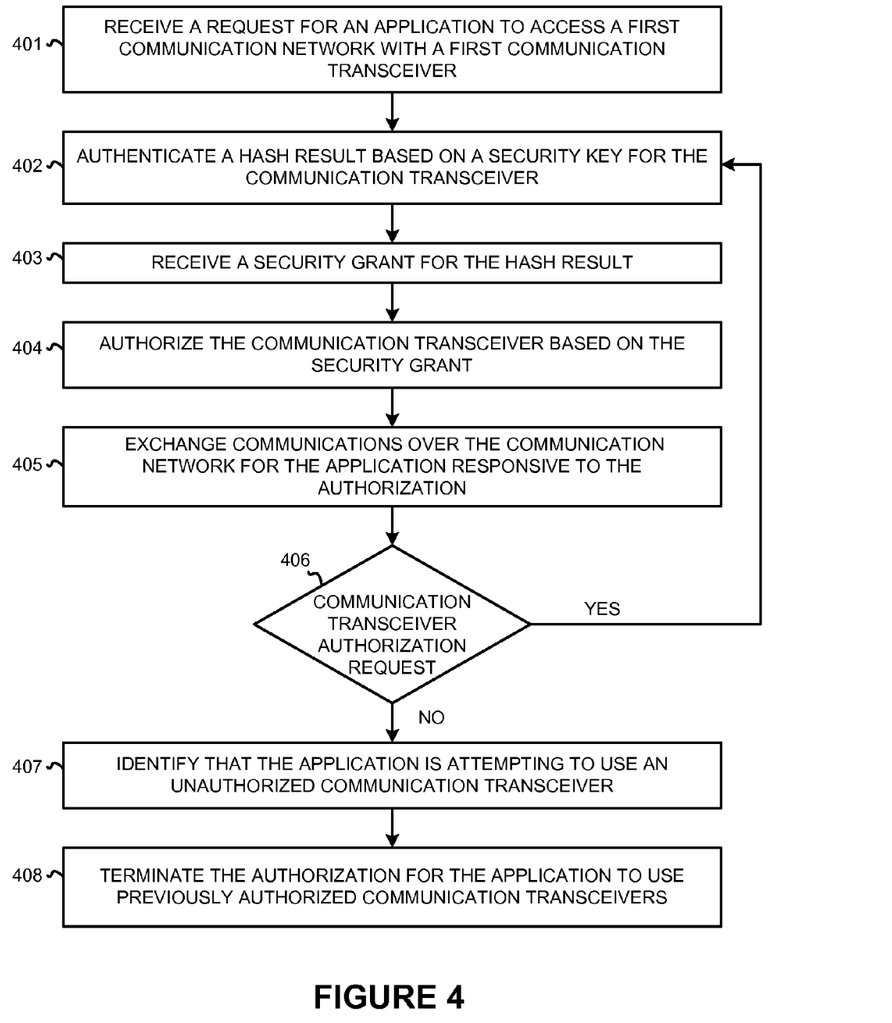
FIG. 4 is a flow diagram illustrating a method of operation of a communication system.

As an example operation of the elements of system 300, FIG. 4 is provided. FIG. 4 is a flow diagram illustrating a method of operation of communication system 300. The operations of FIG. 4 are referenced below parenthetically. In FIG. 4, secure zone 314 of WCD 310 receives (401) a request for an application of open zone 312 to access a first communication network with a first communication transceiver. In this example, the application is attempting to access LTE network 360 through an LTE transceiver of WCD 310, although other networks can be requested for access.

The application can request access in response to user activity, such as a user of WCD 310 browsing Internet content, initiating a voice call, sending a text message, transferring a picture, or other activities on WCD 310 which use a communication transceiver to access a communication network. In some examples, the application is a secure access application which requests access and authorization to ensure authenticated or secure communications over a communication network, where the application must first be authorized to use a particular communication transceiver.

WCD 310 authenticates (402) a hash result based on a security key for the first communication transceiver. The hash results can be determined based on a cryptographic hash function. For example, a security key can be processed by a cryptographic hash function such as secure hash algorithm (SHA) or message digest algorithm (MD) to determine a cryptographic hash result which is used as the hash result discussed here. The hash result is transferred in authorization request 380 for delivery to authorization node 330 over link 350.

In this example, WCD 310 includes multiple communication transceivers and also secure zone 314 stores multiple security keys. Each security key can be correlated with one or more transceiver types. For example, WCD 310 can include at least an LTE transceiver, a CDMA transceiver, and a WiFi transceiver, with each transceiver correlated to a different security key. Secure zone 314 can correlate these transceiver types to security keys in a data structure.

WCD 310 receives (403) security grant 381 for the hash result. Security grant 381 is transferred by authorization node 330 for delivery to WCD 310 responsive to a successful authorization of the hash result transferred in authorization request 380. WCD 310 then authorizes (404) the first communication transceiver based on security grant 381. The authorization of the first communication transceiver can include placing the first communication transceiver in a secure mode where only the application which requested access can be authorized or authenticated to transfer communications through the first communication transceiver.

In some examples, secure zone 314 might not select a transceiver or the application might not indicate a preferred transceiver. In these examples, secure zone 314, in response to the request, processes one or more security keys stored in secure zone 314 to determine a hash result for each security key, and transfers the hash results for delivery to authorization node 330 in authorization request 380. Authorization node 330 can select or authorize a particular hash result, and responsively transfer security grant 381 indicating the particular hash result. Secure zone 314, in response to security grant 381, can identify the first communication transceiver as correlated to the particular hash result or a security key used to generate the particular hash result, and then indicate the authorization for the first communication transceiver.

WCD 310 exchanges (405) communications over the communication network for the application responsive to the authorization. The communications are transferred over the first communication transceiver, which in this example is an LTE transceiver used to communicate over LTE network 360. The particular transceiver can be authenticated for use only over a particular communication network, and for use by a particular application on WCD 310. In some examples, wireless network 320 comprises LTE network 360, and thus once authorized to use a communication transceiver associated with LTE network 360, the application can exchange communications, such as with data node 340.

WCD 310 determines (406) if an authorization request is received for another communication transceiver. For example, the application already authorized to use the first communication transceiver can request access to a second communication transceiver different than the first communication transceiver. If the application requests access, a similar authorization process to operations 402-404 can be performed, and the application can be authorized to communicate over the second communication transceiver. This authorization can be used to add additional communication transceivers as authorized communication transceivers, or can be used to replace the first communication transceiver with the second communication transceiver when only one communication transceiver at a time is intended to be authorized.

However, if an authorization request is not received, then WCD 310 identifies (407) that the application is attempting to use an unauthorized communication transceiver, and terminates (408) the authorization for the application to use the previously authorized communication transceiver or transceivers. In this operation, the application might be attempting to use an unauthorized communication transceiver for malicious purposes when the application is only authorized to use the first communication transceiver. In other examples, only one transceiver is authorized to ensure secure communications between WCD 310 and another communication device or node, such as data node 340. When access through a second unauthorized transceiver is attempted, then not only can communications be responsively blocked through the second communication transceiver, but also the authorization of the first communication transceiver is removed. Further attempts to authorize communications through a third or further communication transceivers can be handled similarly to operations 401-408, depending upon the authorization of the respective further communication transceivers as described herein.

By terminating or removing the authorization of various communication transceivers in operation 408, WCD 310 can ensure that no unsecure communications are transferred over unauthorized communication transceivers. Also, termination of the authorization of the first communication transceiver can ensure that any unsecure or malicious communications are not inadvertently transferred. In further examples, the application itself can be terminated responsive to terminating or removing the authorization for the first communication transceiver.

In yet further examples, WCD 310 can detect when another application attempting to use the first communication transceiver, where the other application is different than the application authorized to use the first communication transceiver. WCD 310 can remove authorization for any applications to use the first communication transceiver responsive to the other application trying to use the first communication transceiver without first being authorized. This action can prevent another application from piggybacking unauthorized communications over a communication transceiver that another application has been authorized for communications.

Figure 5:
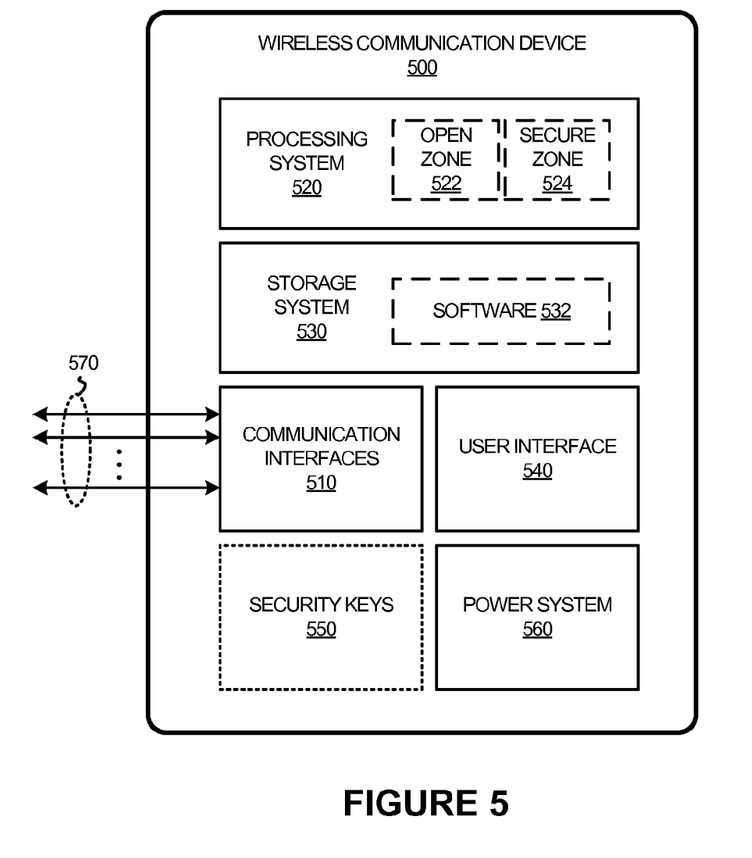
FIG. 5 is a block diagram illustrating a wireless communication device.

FIG. 5 is a block diagram illustrating wireless communication device 500, as an example of WCD 110 found in FIG. 1 or WCD 310 found in FIG. 3, although variations are possible. Wireless communication device 500 includes communication interfaces 510, processing system 520, storage system 530, user interface 540, security keys 550, and power system 560.

Communication interface 510, processing system 520, storage system 530, user interface system 540, security keys 550, and power system 560 are communicatively coupled, and can communicate over associated discrete links, common busses, data links, power links, RF links, or other links. Wireless communication device 500 can be distributed or consolidated among equipment or circuitry that together forms the elements of wireless communication device 500. Wireless communication device 500 can optionally include additional devices, features, or functionality not discussed here for purposes of brevity.

Communication interface 510 comprises one or more communication transceiver circuitry portions and communication interface circuitry for communicating over one or more communication links 570 with one or more communication networks. In some examples, communication interface 510 includes wireless transceiver circuitry and antennas for communicating with base stations of a cellular voice and data network, among other communication networks. Communication interface 510 could include transceiver equipment and antenna elements for wirelessly exchanging user communications and overhead communications over the associated ones of links 570, among further links. Portions of the transceiver circuitry, antenna elements, or other transceiver equipment can be authorized and selected based on security keys 550 as described herein. Communication interface 510 also receives command and control information and instructions from processing system 520 or user interface system 540 for controlling the operations of communications over links 570. Links 570 could each use various protocols or communication formats as described herein for links 140-142, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, system-on-a-chip devices, and logic devices, as well as any other type of processing device, combinations, or variations thereof.

In this example, processing system 520 includes open zone 522 and secure zone 524. Each zone of processing system 520 can be implemented in a separate microprocessor, microprocessor core, virtual core, or other hardware or software partition that separates memory spaces, operating systems, drivers, and other operational hardware and software elements so as to provide a restricted level of access for applications and users to secure zone 524, and a non-restricted level of access for open zone 522. In some examples, open zone 522 comprises a standard core of a processor system, such as for operating an Android, Windows, iOS, or other user-accessible operating system. Likewise, secure zone 524 comprises in some examples, a secure core or "trust zone" core of a processor system which prevents access to the processing and memory elements of secure zone 524 unless authorized through a security exchange or security handshake with an external authorization node.

This partitioned configuration of secure zone 524 differs from user-level password protected access, in that any application that desires to execute on secure zone 524 must first be authorized by a security handshaking process with an external authorization node. Open zone 522 can run applications after a user merely "logs in" or passes a user-level security access, and the applications executed on open zone 522 are not authorized through a security handshaking process with an authorization node.

Storage system 530 can comprise any computer readable storage media or storage device readable by processing system 520 and capable of storing software 532. In some examples, portions of storage system 530 stores security keys 550. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 or other data can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by wireless communication device 500 in general or processing system 520 in particular, direct wireless communication device 500 or processing system 520 to, in security circuitry of secure zone 524, receive a request from processing circuitry for an application to access a first communication network with a first communication transceiver of communication interfaces 510, process the request and a security key to authorize the application to use the first communication transceiver to access the first communication network, exchange communications in the first communication transceiver over the first communication network for the application responsive to the authorization, and in the security circuitry, identify that the application is using a second unauthorized communication transceiver, and in response, terminate the authorization for the application to use the first communication transceiver to access the first communication network, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to, in security circuitry of secure zone 524, receive a request from processing circuitry for an application to access a first communication network with a first communication transceiver of communication interfaces 510, process the request and a security key to authorize the application to use the first communication transceiver to access the first communication network, exchange communications in the first communication transceiver over the first communication network for the application responsive to the authorization, and in the security circuitry, identify that the application is using a second unauthorized communication transceiver, and in response, terminate the authorization for the application to use the first communication transceiver to access the first communication network.

In general, software 532 can, when loaded into processing system 520 and executed, transform processing system 520 overall from a general-purpose computing system into a special-purpose computing system customized to, in security circuitry of secure zone 524, receive a request from processing circuitry for an application to access a first communication network with a first communication transceiver of communication interfaces 510, process the request and a security key to authorize the application to use the first communication transceiver to access the first communication network, exchange communications in the first communication transceiver over the first communication network for the application responsive to the authorization, and in the security circuitry, identify that the application is using a second unauthorized communication transceiver, and in response, terminate the authorization for the application to use the first communication transceiver to access the first communication network, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface system 540 includes equipment and circuitry for receiving user input and control, such as for engaging in voice calls or data sessions, and receiving user instructions for text or video messages, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface system 540 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Security keys 550 comprise one or more security keys, such as those discussed herein. These security keys are stored in a data structure, which can be a sub-portion of storage system 530 accessible only by secure zone 524. In some examples, a separate physical storage device or memory device is employed to store security keys 550 and make available security keys 550 to secure zone 524 and not to open zone 522. In other examples, security keys 550 are stored in a shared memory space or memory device and accessible only by secure zone 524. Security keys 550 can be hard coded during manufacture of wireless communication device 500, such as by including security keys 550 in programmable read-only memory elements accessible only by secure zone 524 and not to open zone 522.

Power system 560 includes circuitry and a power source to provide power to the elements of wireless communication device 500. The power source could include a battery, solar cell, flywheel, capacitor, thermoelectric generator, chemical power source, dynamo, or other power source. In some examples, power system 560 receives power from an external source, such as a wall outlet or power adapter. Power system 560 also includes circuitry to condition, monitor, and distribute electrical power to the elements of wireless communication device 500.

Referring back to FIG. 1, WCD 110 comprises a processing system, a plurality of transceiver portions, security keys, user interface elements, and other communication elements. The transceiver portions typically include amplifiers, filters, modulators, and signal processing circuitry. The transceiver portions can be used to communicate over ones of links 140 and 142, which can include wired, optical, or wireless links. The processing system can include one or more processing portions. WCD 110 can also include user interface systems, memory devices, non-transitory computer-readable storage mediums, software, processing circuitry, or some other communication components. WCD 110 can be a sensor device, user device, subscriber equipment, customer equipment, access terminal, wireless smartphone, computer, mobile Internet appliance, wireless network interface card, media player, game console, or some other communication apparatus, including combinations thereof.

Communication network 120 comprises communication and control systems for providing access to communication services for other devices and networks. Communication network 120 can each provide communication services including communication routing, link bridging, network communications, data exchange, or other communication services. In some examples, communication network 120 is a cellular voice and data network that can provide voice calls, text messages, data access, or other communication services provided over cellular or wireless communication networks. In some examples, communication network 120 includes equipment to provide wireless access to communication services within different coverage areas to user devices, route communications between content providers and user devices, and facilitate handoffs between equipment of different coverage areas, among other operations. Communication network 120 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Remote authorization system 130 comprises computer processing systems and equipment to authorize or select transceiver portions of user devices, such as WCD 110. Remote authorization system 130 can include communication or network interfaces, as well as computer systems, microprocessors, circuitry, cloud-based systems, or some other processing devices or software systems, and can be distributed among multiple processing devices. Examples of remote authorization system 130 can also include software such as an operating system, logs, databases, utilities, drivers, networking software, and other software stored on a computer-readable medium.

Communication links 140-142 each use metal, glass, optical, air, space, or some other material as the transport media. Communication links 140-142 can each use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication links 140-142 can each be a direct link or can include intermediate networks, systems, or devices, and can include a logical network link transported over multiple physical links. Communication links 140-142 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

In some examples, communication links 140-142 are wireless links, and use the air or space as the transport media. Wireless links 140-142 each comprises one or more communication links provided over an associated wireless frequency spectrum or wireless frequency band, and can use various protocols. In this example, wireless links 140-142 can comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 140-142 is shown in FIG. 1, it should be understood that links 140-142 are merely illustrative to show communication modes or access pathways for WCD 110 and remote authorization system 130. In other examples, further links can be shown, with portions of the further wireless links shared and used for different communication sessions or different content types, among other configurations.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device comprising security circuitry that stores one or more security keys, processing circuitry that executes applications, and a plurality of communication transceivers to communicate over a plurality of communication networks, the method comprising:
   in the security circuitry, receiving a request from the processing circuitry for an application to access a first communication network with a first communication transceiver;
   in the security circuitry, processing the request and a security key to authorize the application to use the first communication transceiver to access the first communication network;
   in the first communication transceiver, exchanging communications over the first communication network for the application responsive to the authorization; and
   in the security circuitry, identifying that the application is using a second unauthorized communication transceiver, and in response, terminating the authorization for the application to use the first communication transceiver to access the first communication network.

2. The method of claim 1, wherein processing the request and the security key to authorize the application to use the first communication transceiver to access the first communication network comprises authenticating with an external authorization node using a hash result based on at least the security key.

3. The method of claim 2, further comprising:
   transferring the hash result for delivery to the external authorization node, and responsively receiving a security grant transferred by the external authorization node indicating the hash result.

4. The method of claim 1, wherein the security key comprises a first security key, wherein each of the one or more of the security keys correspond to a different one of the plurality of communication transceivers, and wherein the first security key corresponds to the first communication transceiver.

5. The method of claim 4, further comprising:
   in the security circuitry, in response to the request, processing the one or more security keys to determine a hash result for each security key, transferring the hash results for delivery to an external authorization node, and responsively receiving a security grant transferred by the external authorization node indicating a first hash result of the hash results;
   in the security circuitry, in response to the security grant, identifying the first communication transceiver as associated with the first hash result and the first security key, and indicating the authorization for the first communication transceiver.

6. The method of claim 1, wherein identifying that the application is using the second unauthorized communication transceiver comprises identifying when the application attempts to exchange the communications over a second communication network associated with the second unauthorized communication transceiver.

7. The method of claim 1, wherein terminating the authorization for the application to use the first communication transceiver to access the first communication network comprises terminating the application.

8. The method of claim 1, further comprising:
   transferring a termination alert responsive to terminating the authorization for the application to use the first communication transceiver.

9. The method of claim 1, further comprising:
   in the security circuitry, receiving a second request from the processing circuitry for the application to access the second communication network with the second communication transceiver while the authorization is not terminated for the first communication transceiver;
   in the security circuitry, processing the second request and a second security key to authorize the application to use the second communication transceiver to access the second communication network;
   exchanging further communications for the application over any of the first communication network and the second communication network responsive to the authorization to use the second communication transceiver and the authorization not being terminated for the first communication transceiver.

10. The method of claim 9, further comprising:
    in the security circuitry, identifying that the application is using a third unauthorized communication transceiver, and in response, terminating the authorization for the application to use the first communication transceiver to access the first communication network and terminating the authorization for the application to use the second communication transceiver to access the second communication network.

11. A wireless communication device, comprising:
    security circuitry that stores one or more security keys;

processing circuitry that executes applications; and a plurality of communication transceivers to communicate over a plurality of communication networks;

the security circuitry configured to receive a request from the processing circuitry for an application to access a first communication network with a first communication transceiver, and process the request and a security key to authorize the application to use the first communication transceiver to access the first communication network;

the first communication transceiver configured to exchange communications over the first communication network for the application responsive to the authorization; and the security circuitry configured to identify that the application is using a second unauthorized communication transceiver, and in response, terminate the authorization for the application to use the first communication transceiver to access the first communication network.

12. The wireless communication device of claim 11, comprising:

the security circuitry configured to authenticate with an external authorization node using a hash result based on at least the security key to authorize the application to use the first communication transceiver.

13. The wireless communication device of claim 12, comprising:

the wireless communication device configured to transfer the hash result for delivery to the external authorization node, and responsively receiving a security grant transferred by the external authorization node indicating the hash result.

14. The wireless communication device of claim 11, wherein the security key comprises a first security key, wherein each of the one or more of the security keys correspond to a different one of the plurality of communication transceivers, and wherein the first security key corresponds to the first communication transceiver.

15. The wireless communication device of claim 14, comprising:

in response to the request, the security circuitry configured to process the one or more security keys to determine a hash result for each security key;

the wireless communication device configured to transfer the hash results for delivery to an external authorization node, and responsively receive a security grant transferred by the external authorization node indicating a first hash result of the hash results;

in response to the security grant, the security circuitry configured to identify the first communication transceiver as associated with the first hash result and the first security key, and indicate the authorization for the first communication transceiver.

16. The wireless communication device of claim 11, comprising:

the security circuitry configured to identify when the application attempts to exchange the communications over a second communication network associated with the second unauthorized communication transceiver to identify that the application is using the second unauthorized communication transceiver.

17. The wireless communication device of claim 11, comprising:

the security circuitry configured to terminate the application to terminate the authorization for the application to use the first communication transceiver.

18. The wireless communication device of claim 11, comprising:

the wireless communication device configured to transfer a termination alert responsive to terminating the authorization for the application to use the first communication transceiver.

19. The method of claim 11, comprising:

the security circuitry configured to receive a second request from the processing circuitry for the application to access the second communication network with the second communication transceiver while the authorization is not terminated for the first communication transceiver;

the security circuitry configured to process the second request and a second security key to authorize the application to use the second communication transceiver to access the second communication network;

the first communication network and the second communication network configured to exchanging further communications for the application responsive to the authorization to use the second communication transceiver and the authorization not being terminated for the first communication transceiver.

20. The method of claim 19, comprising:

the security circuitry configured to identify that the application is using a third unauthorized communication transceiver, and in response, terminate the authorization for the application to use the first communication transceiver to access the first communication network and terminate the authorization for the application to use the second communication transceiver to access the second communication network.

\* \* \* \* \*